United States Patent
Martin et al.

(10) Patent No.: US 6,196,252 B1
(45) Date of Patent: Mar. 6, 2001

(54) SHUTTLE VALVE FOR A MULTIPATH HYDRAULIC CIRCUIT WITH BYPASS PRESSURE VENTING

(75) Inventors: Berthold Martin, Shelby Township; Valentin Botosan, Rochester; Charles K. Streetman, Sterling Heights, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/408,779

(22) Filed: Sep. 30, 1999

(51) Int. Cl.[7] .................................................. F16K 11/07
(52) U.S. Cl. ........................ 137/102; 137/112; 192/3.57
(58) Field of Search ................................ 137/102, 112, 137/113, 107; 192/3.57

(56) References Cited

U.S. PATENT DOCUMENTS

| | | |
|---|---|---|
| 2,610,859 * | 9/1952 | Wilcox . |
| 3,338,257 * | 8/1967 | Ferguson .............................. 137/112 |
| 3,850,274 | 11/1974 | McLean . |
| 3,963,383 | 6/1976 | Hill . |
| 3,996,965 | 12/1976 | Peters . |
| 4,121,499 | 10/1978 | Hay . |
| 4,217,934 | 8/1980 | Peters . |
| 4,250,795 | 2/1981 | Martinic . |
| 4,253,481 * | 3/1981 | Sarlls, Jr. .............................. 137/112 |
| 4,261,451 | 4/1981 | Strong . |
| 4,324,311 | 4/1982 | Farris . |
| 4,485,876 | 12/1984 | Speller . |
| 4,592,382 * | 6/1986 | Rubin et al. .......................... 137/218 |
| 4,736,965 | 4/1988 | Smith . |
| 4,819,609 | 4/1989 | Tippmann . |
| 4,843,920 | 7/1989 | Hayasaki et al. . |
| 4,850,192 | 7/1989 | Mitsumasa et al. . |
| 4,852,663 | 8/1989 | Hunt . |
| 4,856,549 | 8/1989 | Ueno . |
| 5,163,474 | 11/1992 | Rizk . |
| 5,234,031 | 8/1993 | Pickett et al. . |
| 5,297,860 | 3/1994 | Nakamura . |
| 5,299,859 | 4/1994 | Tackett et al. . |
| 5,682,791 | 11/1997 | Liesener . |

* cited by examiner

Primary Examiner—Stephen M. Hepperle
(74) Attorney, Agent, or Firm—Roland A. Fuller, III

(57) ABSTRACT

The present invention provides a shuttle valve for a multi-path hydraulic circuit comprising a valve body having a main passage extending along an axis and having a uniform inner periphery. The shuttle valve further has a slider valve positioned within the main passage which has a first section adjacent and attached to a second section. The first section has a first outer periphery substantially similar to the inner periphery of the main passage such that the first section of the slider valve and the main passage substantially prevent fluid flow therebetween. The first outer periphery extends a predetermined length which is shorter than the intersection length. The second section has a second outer periphery with a recessed portion being recessed from the outer periphery of the main passage such that fluid is able to pass between the second section and the inner periphery of the main passage. As a result, fluid is able to pass from the first passage and around the slider valve and to the second passage or the third passage.

12 Claims, 3 Drawing Sheets

SHUTTLE VALVE FOR A MULTIPATH HYDRAULIC CIRCUIT WITH BYPASS PRESSURE VENTING

FIELD OF THE INVENTION

The present invention relates generally to a shuttle valve for a hydraulic circuit and, more particularly, to a shuttle valve for hydraulic circuit which allows drainage back through the shuttle valve.

BACKGROUND OF THE INVENTION

Shuttle valves for multi-path hydraulic circuits are used to provide fluid pressure from several passages entering the shuttle valve to one passage exiting the shuttle valve. For instance, in 3-way hydraulic circuits in automatic transmissions, shuttle valves are used to supply transmission fluid into a first passage exiting the shuttle valve from either a second or a third passage entering the shuttle valve. The shuttle valve ensures that transmission fluid provided by the second passage is supplied to the first passage without leaking back out through the third passage. Likewise, if fluid is supplied by the third passage, the shuttle valve ensures that this fluid is supplied to the exiting first passage and not back out through the second passage. While shuttle valves employed in this fashion suitably channel fluid into the appropriate passage, several drawbacks exist when this type of valve is used in conjunction with clutch elements on automatic transmissions.

In automatic transmissions, transmission fluid is many times required to be supplied to one clutch element from different sources. As disclosed in U.S. patent application Ser. No. 09/283,567, filed on Apr. 1, 1999, and assigned to the assignee of the present application and hereinafter incorporated by reference, a transmission fluid circuit contains an OD clutch element which is actuated either by a manual shift valve or a electronic solenoid valve. As such, a 3-way shuttle valve can be used to supply transmission fluid pressure from either of these sources to the OD clutch element. This valve ensures that pressure supplied through the OD solenoid valve is provided to the OD clutch element and does not leak back through the manual shift valve. Likewise, the 3-way shuttle valve ensures that fluid pressure supplied from the manual shift valve is supplied to the OD clutch element and does not leak back through the OD solenoid valve.

However, it is important that transmission fluid contained within the OD clutch element is allowed to leak back through the shuttle valve when the OD clutch element ceases to be applied. This leak back ensures that the clutch element is released and does not, instead, burn up due to frictional engagement of rotating elements within the transmission. To provide for this leak back, hydraulic pressure from the OD clutch element pushes the slider valve either toward the passage leading from the manual shift valve or the OD solenoid valve, thereby sealing one of these two passages. The passage remaining open provides the conduit for fluid to leak back from the OD clutch element.

However, if the slider valve is positioned directly under the exiting passage to the OD clutch element, hydraulic force from the clutch element is unable to push the slider valve in either direction. As a result, transmission fluid is trapped in the OD clutch element, thereby maintaining the OD clutch element in an engaged state. The present invention was developed in light of this drawback.

SUMMARY OF THE INVENTION

It is therefore an object of the present invention to provide a shuttle valve having a slider valve which will allow drainage of fluid back through the shuttle valve even if the slider valve is positioned directly under the exiting passage.

To achieve these and other objects, the present invention provides a shuttle valve for a multipath hydraulic circuit comprising a valve body having a main passage extending along an axis and having a uniform inner periphery. The valve body has a first passage intersecting the inner periphery of the main passage at a first intersection area. The first intersection area has an intersection length extending parallel to the axis. The valve body has a second passage intersecting the inner periphery of the main passage at a second intersection area. The second intersection area is positioned away from the first intersection area in a direction parallel to the axis. The valve body has a third passage intersecting the inner periphery of the main passage at a third intersection area. The third intersection area is located away from the first intersection area and positioned on an opposite side of the first intersection area from the second intersection area. The shuttle valve further has a slider valve positioned within the main passage which has a first section adjacent and attached to a second section. The first section has a first outer periphery substantially similar to the inner periphery of the passage such that the first section of the slider valve and the main passage substantially prevent fluid flow therebetween. The first outer periphery extends a predetermined length parallel to the axis and which is shorter than the intersection length. The second section has a second outer periphery with a recessed portion being recessed from the outer periphery of the main passage such that fluid is able to pass between the second section and the inner periphery of the main passage. As a result, fluid is able to pass from the first passage and around the slider valve and to the second passage or the third passage.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 6 is a cross-sectional view of a shuttle valve according to the present invention.

DETAILED DESCRIPTION OF THE PREFERRED EMBODIMENTS

Figure 1:
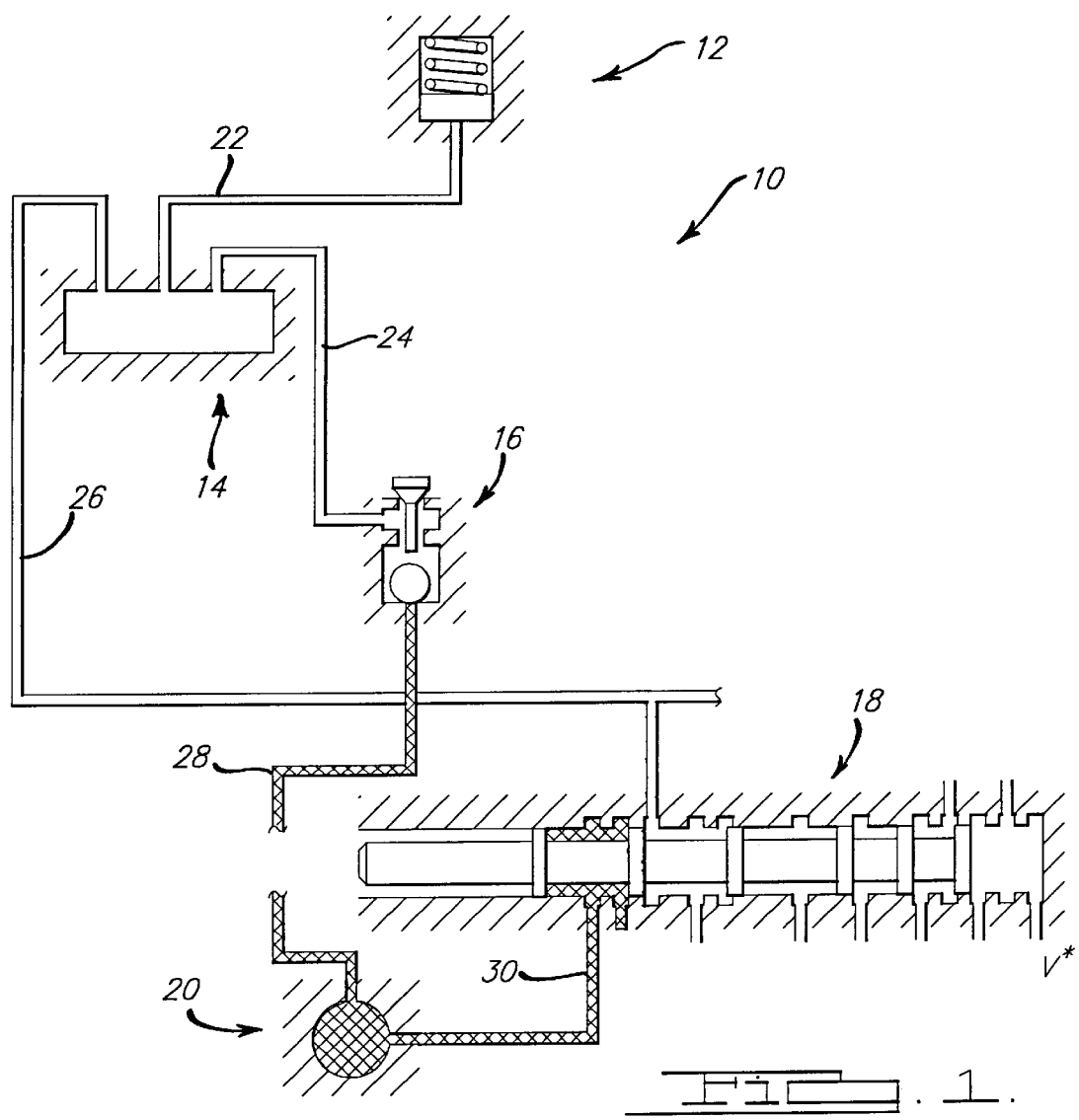
FIG. 1 is a schematic view of a shuttle valve being used in conjunction with an automatic transmission according to the present invention.

Referring now to FIG. 1, a hydraulic circuit 10 is shown having an OD clutch element 12, shuttle valve 14, OD solenoid valve 16, manual valve 18, and fluid pump 20. Shuttle valve 14 provides transmission fluid from either OD solenoid valve 16 or manual valve 18 to OD clutch element 12. To accomplish this function, shuttle valve 14 needs to communicate with these external elements through first line 22, second line 24, third line 26 and fourth lines 28 and 30. As such, first line 22 provides fluid communication between OD clutch element 12 and shuttle valve 14. Second line 24 provides fluid communication between shuttle valve 14 and OD solenoid valve 16. Third line 26 provides fluid communication between shuttle valve 14 and manual valve 18. Lastly, fourth lines 28 and 30 provide fluid communication between fluid pump 20 and OD solenoid valve 16 and manual valve 18 respectively.

Figure 2:
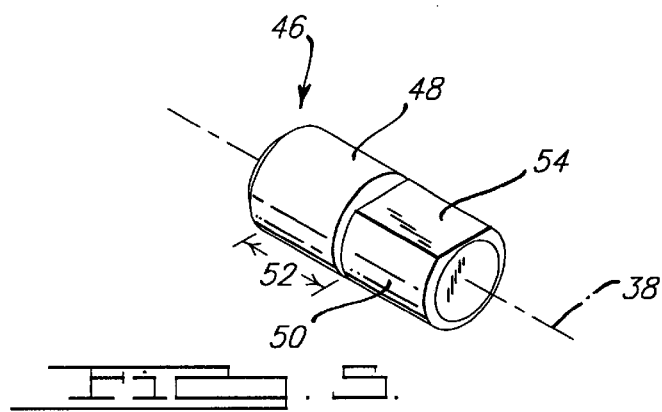
FIG. 2 is a cross-sectional view of a shuttle valve in a first position according to the present invention.
Figure 2:
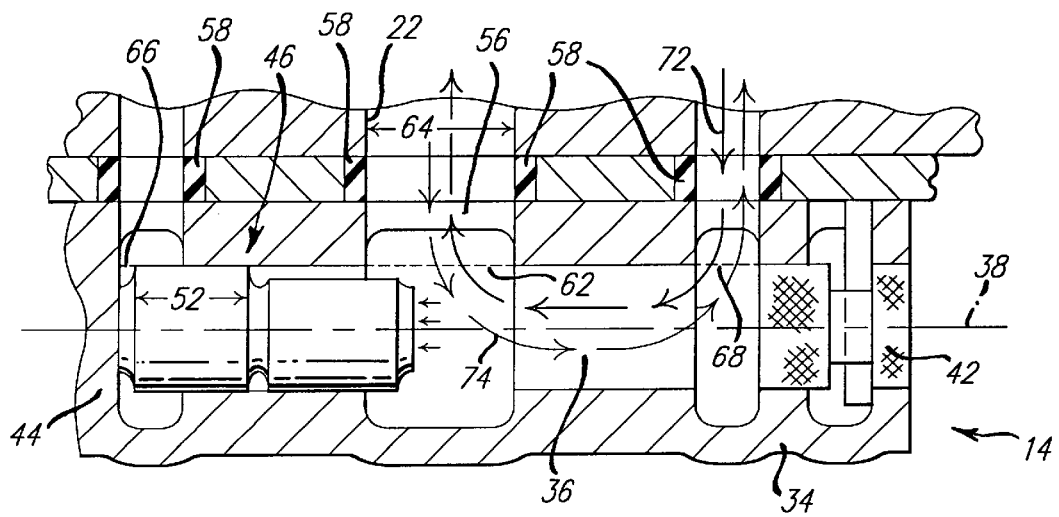
Figure 3:
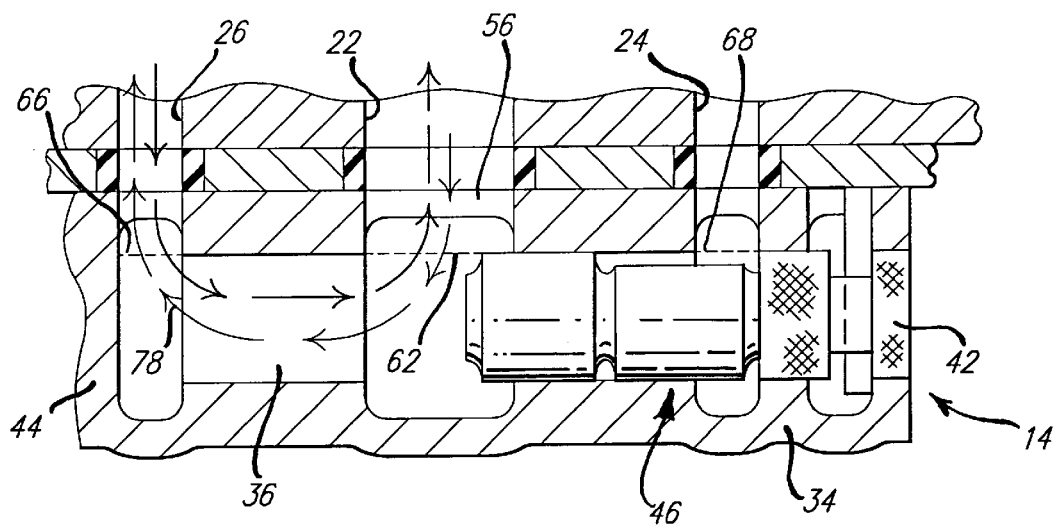
FIG. 3 is a cross-sectional view of a shuttle valve in a second position according to the present invention.
Figure 4:
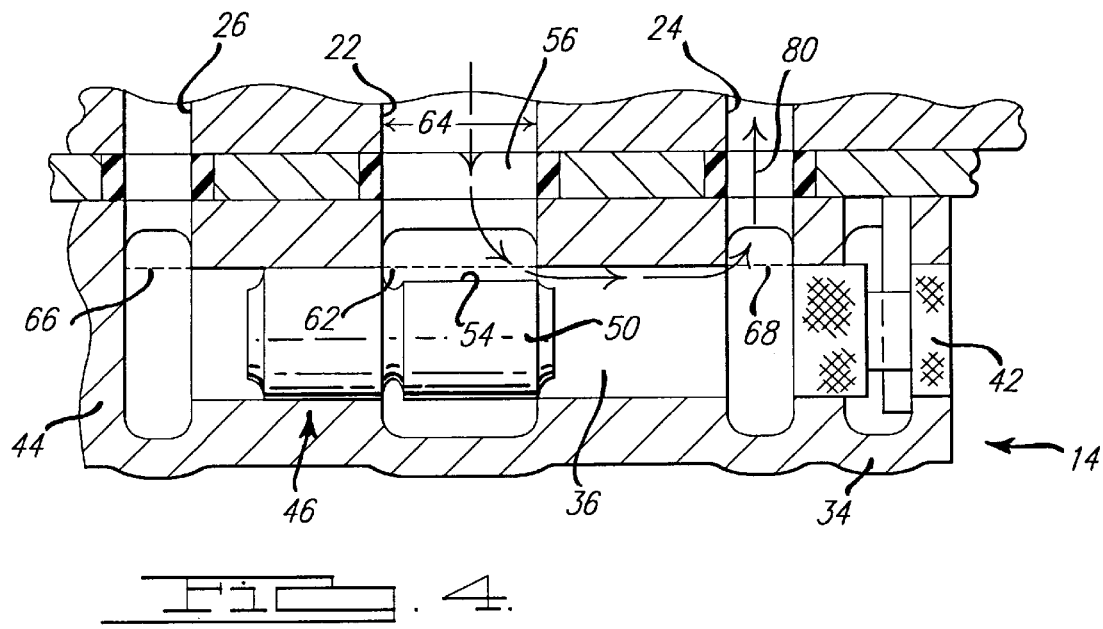
FIG. 4 is a cross-sectional view of a shuttle valve in a third position according to the present invention.

Referring now to FIGS. 2, 3, and 4, shuttle valve 14 will be described in greater detail. Shuttle valve 14 generally comprises a valve body 34 having a main passage 36 extending along an axis 38. A first end of a main passage 36 is blocked by stopper 42, while a second end 44 of main passage 36 is blocked by valve body 34.

Figure 5:
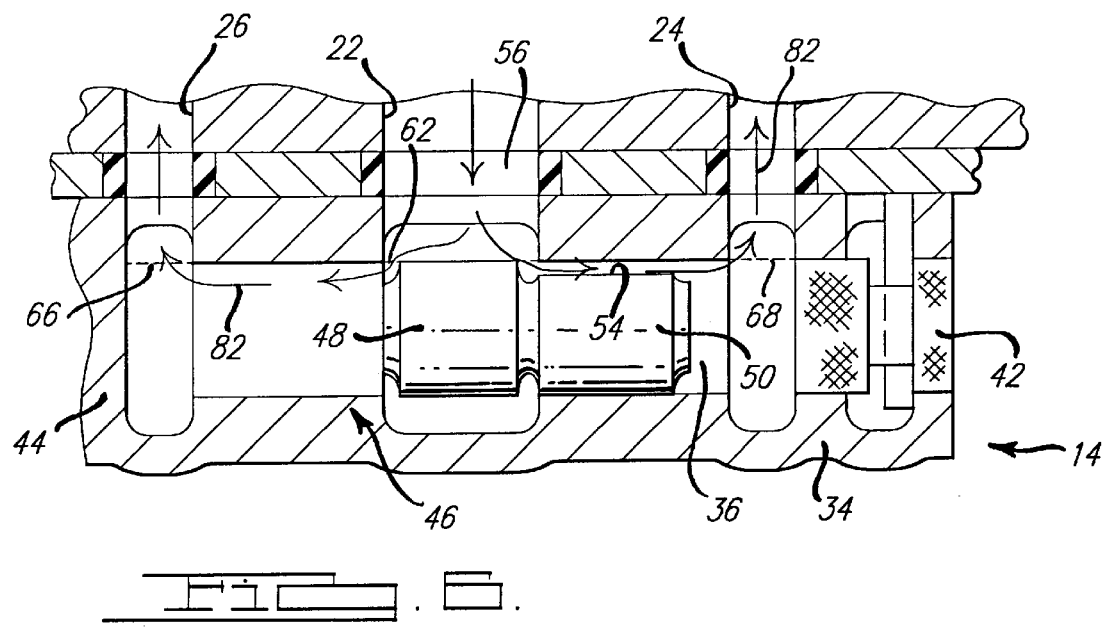
FIG. 5 is a perspective view of a slider valve of a shuttle valve according to the present invention.

Internal to main passage 36 is positioned slider valve 46. Referring to FIG. 5, it can be seen that slider valve 46 comprises a first section 48 and a second section 50. As shown, first section 48 has a uniform periphery, in this case cylindrical, extending along length 52. This uniform periphery does not include any chamfers or grooves contained therein (see FIG. 2).

Second section 50 also has a uniform periphery extending along its length parallel to axis 38 except for recessed portion 54. Here, recessed portion 54 is shown as a flat machined into the outer periphery of second section 50.

Referring back to FIGS. 2, 3, and 4, the cylindrical inner periphery of main passage 36 is substantially the same to that as the outer periphery of first section 48 and second section 50, absent the recessed portion 54. The uniformity of the inner periphery of main passage 36 combined with the uniformity of the outer periphery of slider valve 46 allows slider valve 46 to slide freely along axis 38 of main passage 36 while preventing fluid to pass therebetween.

Valve body 34 has a first passage 56 which provides fluid communication from the main passage 36, through connector bushing 58 and to first line 22. Where first passage 56 intersects main passage 36, there exists a first intersection area 62. This intersection area has an intersection length 64, which extends along a direction parallel to axis 38. Exiting main passage 36 at second end 44 is a third passage which intersects main passage 36 at third intersection area 66. Third Intersection area 66 allows fluid communication between main passage 36, through connector bushing 58 and to third line 26. Lastly, exiting main passage 36 at a position parallel to axis 38 and on an opposite side of first passage 56 is a second passage which intersects main passage 36 at second intersection area 68. Second intersection area 68 provides fluid communication between main passage 36, through connector bushing 58 and to second line 24.

Referring now to FIGS. 1, 2, 3, and 4, the operation of the present invention will now be described.

When the OD clutch element 12 is to be actuated by fluid supplied through second line 24, OD solenoid valve 16 opens and allows fluid from fourth line 28 to flow therethrough and enter shuttle valve 14 through second intersection area 68. This fluid follows the path defined by arrows 72 and pushes slider valve 46 against second end 44. This, in turn, opens first intersection area 62 to main passage 36, thus allowing fluid to flow from the second intersection area 68, through main passage 36 and ultimately out first passage 62. Fluid flowing from first passage 62 then enters first line 22, thereby actuating OD clutch element 12.

When OD clutch element 12 is actuated by manual valve 18, fluid passes from fifth line 30 through third line 26 and into shuttle valve 14. As shown in FIG. 3, fluid from third line 26 enters third intersection area 66 and presses slider valve 46 against stopper 42. This, in turn, opens first passage 62, thereby allowing fluid to flow from third intersection area 66, through main passage 36 and ultimately out first passage 62.

When OD clutch element 12 is to be released, both OD solenoid valve 16 and manual valve 18 cease providing flow of transmission fluid to shuttle valve 14. However, OD clutch element 12 as well as first line 22 still contain transmission fluid. Due to gravity and spring forces by OD clutch element 12 (as is known), this fluid is forced back into shuttle valve 14. If the position of slider valve 46 is toward second end 44 as shown in FIG. 2, transmission fluid will drain from first intersection area 62 and out second intersection area 68 as depicted by arrows 74. Likewise, if shuttle valve 46 is positioned toward stopper 42 as shown in FIG. 3, then transmission fluid is able to flow from first intersection area 62 and out third intersection area 66 as shown by arrows 78.

If second section 50 is positioned under first passage 56 when OD clutch element 12 is to be released, transmission fluid is able to flow between the outer periphery of main passage 36 and recessed portion 54 and out second intersection area 68 as shown by arrows 80 (see FIG. 4). If first section 48 is positioned under first passage 56, then fluid will pass from first intersection area 62 to third intersection area 66 and second intersection area 68 as shown by arrows 82. The smaller length 52 of first section 48 with respect to the larger intersection section length 64 allows this flow to occur.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A shuttle valve for a multipath hydraulic circuit, said shuttle valve comprising:

a valve body having a main passage extending along an axis and having a uniform inner periphery, said valve body having a first passage intersecting said inner periphery of said main passage at a first intersection area, said first intersection area having an intersection length extending parallel to said axis, said valve body having a second passage intersecting said inner periphery of said main passage at a second intersection area, said second intersection area being away from said first intersection area in a direction parallel to said axis, said valve body having a third passage intersecting said inner periphery of said main passage at a third intersection area, said third intersection area being located away from said first intersection area and positioned on an opposite side of said first intersection area from said second intersection area;

a slider valve positioned within said main passage, said slider valve having a first section adjacent and attached to a second section, said first section having a first outer periphery substantially similar to said inner periphery of said passage such that said first section of said slider valve and said main passage substantially prevent fluid flow therebetween, said first outer periphery extending a predetermined length parallel to said axis, said predetermined length being shorter than said intersection length of said first intersection area;

said second section having a second outer periphery, said second outer periphery having a recessed portion being recessed from said outer periphery of said main passage such that fluid is able to pass between said second section and said inner periphery of said main passage; and whereby fluid is able to pass from said first passage and around said slider valve and to said second passage or said third passage.

2. A shuttle valve as claimed in claim 1, wherein said slider valve and said inner periphery of said main passage is cylindrical.

3. A shuttle valve as claimed in claim 2, wherein said first intersection point, said second intersection point and said third intersection point extend completely around said main passage.

4. A shuttle valve as claimed in claim 1, wherein said recessed portion is a flat extending along an entire length of said second portion, said length of said second portion being parallel with said axis.

5. A shuttle valve as claimed in claim 1, wherein said first passage feeds a clutch element of an automatic transmission.

6. A shuttle valve as claimed in claim 5, wherein said clutch element is an overdrive clutch element.

7. A shuttle valve for a multipath hydraulic circuit, said shuttle valve comprising:

a valve body having a cylindrically shaped main passage extending along an axis and having a uniform inner periphery, said valve body having a first passage intersecting said inner periphery of said main passage at a first intersection area, said first intersection area extending circumferentially around said inner periphery of said main passage and having an intersection length extending parallel to said axis, said valve body having a second passage intersecting said inner periphery of said main passage at a second intersection area, said second intersection area being away from said first intersection area in a direction parallel to said axis, said valve body having a third passage intersecting said inner periphery of said main passage at a third intersection area, said third intersection area being located away from said first intersection area and positioned on an opposite side of said first intersection area from said second intersection area;

a slider valve positioned within said main passage, said slider valve having a first section adjacent and attached to a second section, said first section having a first outer periphery substantially similar to said inner periphery of said passage such that said first section of said slider valve and said main passage substantially prevent said transmission fluid flow therebetween, said first outer periphery extending a predetermined length parallel to said axis, said predetermined length being shorter than said intersection length of said first intersection area;

said second section having a second outer periphery, said second outer periphery having a recessed portion being recessed from said outer periphery of said main passage such that said transmission fluid is able to pass between said second section and said inner periphery of said main passage; and whereby said transmission fluid is able to pass from said first passage and around said slider valve and to said second passage or said third passage.

8. A shuttle valve as claimed in claim 7, wherein said recessed portion is a flat extending along an entire length of said second portion, said length of said second portion being parallel with said axis.

9. A shuttle valve as claimed in claim 7, wherein said first passage feeds a clutch element of an automatic transmission.

10. A shuttle valve as claimed in claim 9, wherein said clutch element is an overdrive clutch element.

11. A shuttle valve as claimed in claim 7, wherein said second passage fluidly communicates with a manual valve.

12. A shuttle valve as claimed in claim 7, wherein said third passage connects with an overdrive solenoid valve.

* * * * *